J. C. MACFARLANE, H. BURGE & A. WILLIAMS.
MEANS FOR REGULATING ELECTRICALLY OPERATED DRIVING SYSTEMS.
APPLICATION FILED DEC. 22, 1911.
1,019,677.
Patented Mar. 5, 1912.
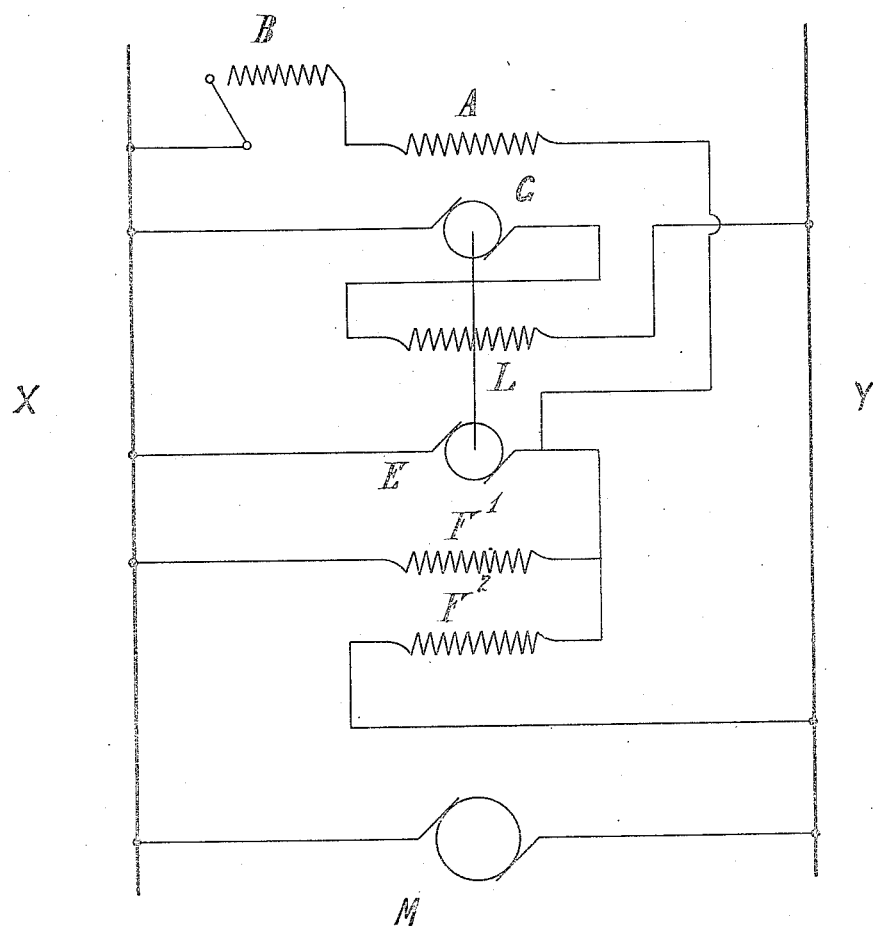

UNITED STATES PATENT OFFICE.

JAMES COLQUHOUN MACFARLANE AND HARRY BURGE, OF CHELMSFORD, AND ALAN WILLIAMS, OF LONDON WALL, LONDON, ENGLAND, ASSIGNORS TO CROMPTON & COMPANY, LIMITED, OF CHELMSFORD, ENGLAND.

MEANS FOR REGULATING ELECTRICALLY-OPERATED DRIVING SYSTEMS.

1,019,677. Specification of Letters Patent. Patented Mar. 5, 1912.

Application filed December 22, 1911. Serial No. 667,368.

*To all whom it may concern:*

Be it known that we, JAMES COLQUHOUN MACFARLANE and HARRY BURGE, residing at Arc Works, Chelmsford, in the county of Essex, England, and ALAN WILLIAMS, residing at Salisbury House, London Wall, London, England, all subjects of the King of Great Britain, have invented certain new and useful Improvements in Means for Regulating Electrically-Operated Driving Systems, of which the following is a specification.

This invention relates to electrically-operated driving systems wherein wide variations in torque and speed occur while the demand for power from the supply is restricted, and the invention has for its object to provide means for improving the regulation and torque of the "working" motors in such systems.

Electrically-operated hauling or winding machinery, or electrically-operated rolling mills, possess the characteristics above referred to, and the invention will be hereafter described, by way of example, in connection therewith.

The invention consists primarily in the provision of an auxiliary field winding on the working motor so arranged that, at low speeds a powerful field is produced giving the torque necessary to produce acceleration, such field strength diminishing as the speed increases and becoming a minimum at the full speed of the motor.

The accompanying drawing illustrates diagrammatically the application of the invention to, say, a colliery winding plant.

G represents a generator of the direct current type provided with a variable field excitation A and a hand controlled resistance B so that it is capable of delivering its current at any desired voltage, and E is an exciter direct coupled to the generator and developing exciting current at a constant voltage.

X and Y are supply conductors connected to the brushes of the generator G and leading current to the motor M, of which the conductor X may be regarded as at zero potential and the conductor Y may be regarded as having a potential $V^g$, that is to say, the potential produced by the generator G the magnitude of which depends upon the amount of excitation and the speed of such generator.

A reversing switch may be employed so as to reverse the current through the motor M when desired, as is well understood but which is not illustrated in the drawing.

The field of the motor is provided with a winding $F^1$ excited directly from the brushes of the exciter E or from any other suitable source of constant current supply and therefore traversed by a constant current the potential across its terminals being $V^e$ that is to say, the constant voltage of the exciter or other source of supply. A second winding $F^2$ is provided and is connected from the positive brush of the exciter or from the positive pole of the supply to the conductor Y, the voltage at the terminals of this winding is the difference between the voltages at the positive brush of the exciter or the positive pole of the source of supply and the positive brush of the generator, that is to say, is equal to $V^e - V^g$. Consequently the current in this winding vanishes when the generator potential is equal to the exciter or the supply potential and changes sign when the generator potential exceeds the exciter or supply potential so as to actually produce a demagnetizing action. In combination with this winding of the motor field we find it advantageous to employ a demagnetizing series winding on the field of the generator G as shown at L which operates to reduce the fluctuations of the current. This demagnetizing series field winding L, under ordinary running conditions, operates to reduce the potential $V^g$ of conductor Y and thereby to increase the potential $V^e - V^g$ at the terminals of the winding $F^2$. But when regeneration occurs, that is to say, when the working motor M tends to return current to the line, the demagnetizing series winding L operates to increase the potential $V^g$ of conductor Y and consequently to reduce the potential $V^e - V^g$ at the terminals of the winding $F^2$. By this means limit current conditions are obtained.

From the foregoing, it will be understood that the working motor M has a relatively high torque when running at low speed, as the voltage of the generator is then regulated to a very low value by the variable resistance B and, hence, the motor field will be excited by the motor field winding $F^1$ and also by the motor field winding $F^2$ owing to the higher voltage of the exciter as compared to that of the generator which will cause the exciter current to flow through the winding $F^2$ in a direction to magnetize the motor field, and this high torque of the motor enables rapid acceleration thereof. When the working motor M is running at full speed, the strength of its field is automatically reduced by the demagnetizing effect of the winding $F^2$, as the voltage at the positive side of the generator is then as high or higher than that of the exciter and the current will then flow through the motor field winding $F^2$ in an opposite direction, thereby reducing the exciting effect of the motor field winding $F^1$, this demagnetizing effect of the motor field increasing with the increase in voltage of the generator and thus producing automatic regulation of the motor. By using the series demagnetizing winding L for the generator field in combination with the motor field windings herein described, a limitation is placed on the demand of current from the generator by the motor and a regenerative braking effect is also obtained. For example, as the amount of current flowing from the generator to the motor increases, the field strength and consequently the current output of the generator is reduced by the flow of such current through the generator field winding L which then has a demagnetizing effect on the generator field, and should the motor operate in a manner to produce a regenerating effect or a tendency to produce a counter-electromotive force, the field winding L of the generator operates to increase the potential of the generator current in the conductor Y and thus oppose the tendency of the motor to return current to the line.

What we claim is.

1. Electrically-operated driving apparatus of the class described comprising, in combination, a direct current generator, means for exciting the field thereof, a motor, means for connecting the armature thereof to said generator, and a field winding for said motor having its terminals connected to the positive poles of the generator and exciting means respectively.

2. Electrically-operated driving apparatus of the class described comprising, in combination, a direct current generator having a field provided with means for varying the excitation thereof whereby said generator may deliver current at different voltages, means for exciting the field of said generator, a motor connected to receive current from said generator and having a constant excitation winding and also a field winding, the latter having its terminals connected to the poles of like polarity of said generator and exciting means respectively.

3. Electrically-operated driving apparatus of the class described comprising, in combination, a direct current generator, exciting means connected to the field of the generator, a motor connected to receive current from the generator and having a field winding connected to the poles of like polarity of the generator and said exciting means, and a de-magnetizing field winding for the generator connected in series between the generator and motor.

In testimony whereof we have hereunto set our hands in presence of two subscribing witnesses.

JAMES COLQUHOUN MACFARLANE.
HARRY BURGE.
ALAN WILLIAMS.

Witnesses:
  NEVILLE E. BROOKES,
  ERNEST JOHN HILL.